Patented Sept. 13, 1949

2,481,933

UNITED STATES PATENT OFFICE 2,481,933

TREATMENT OF SUEDE LEATHER WITH SYNTHETIC POLYMERS

Donald Taylor Kirby, Claymont, and John Thomas Chain, Wilmington, Del., assignors to E. I. du Pont de Nemours & Company, Wilmington, Del., a corporation of Delaware No Drawing. Application October 30, 1945, Serial No. 625,684

5 Claims. (Cl. 8—94.13)

This invention relates to the treatment of suede leather and more particularly to the treatment of suede leather with aqueous dispersions of synthetic polymers characterized by their ability to form soft, continuous films when dried on a glass plate.

This invention has as an object reduction of the tendency of dyed suede leather to crock. A further object is to increase the fullness, weight and firmness of suede leather.

These objects are accomplished by the following invention: Fully tanned suede leather in the wet state is treated with an aqueous dispersion of water insoluble synthetic polymer applied from an aqueous bath containing acid or direct dyes or mixtures thereof or from an aqueous bath containing a sulfonated oil fat liquor. After treatment, the suede leather may be further treated by usual methods, after which it is dried and buffed.

We have found it essential for our invention to apply the synthetic polymer dispersions to suede leather from aqueous baths containing either dye or sulfonated oil fat liquor. If these materials are not present in the bath, the polymer tends to deposit on the surfaces a gummy mass rather than deposit evenly around the leather fibers.

In the treatment of suede leather by the method of this invention, the polymer particles become deposited around the individual leather fibers but are believed not to form a continuous film. The mechanism whereby the polymer particles are deposited may be termed "selective absorption." For the purpose of aiding the selective absorption of polymer particles from an aqueous bath by suede leather, acid and direct dyes are similar to sulfonated animal, vegetable and mineral oils. Compounds of both classes have relatively high molecular weights, and compounds of both classes include sulfonic groups in the molecules. To these common characteristics is attributed their ability to aid selective absorption within the meaning of this invention.

It will be noted that the objects of this invention are accomplished without incurring an additional step in the manufacturing process. Furthermore, it is not necessary to disturb the manufacturing conditions in order to derive the advantages of the invention, since the synthetic polymer dispersion is merely incorporated with the dye bath or fat liquor bath which is already commonly used in the tannery.

In the following examples, which illustrate the invention but are not intended to limit it, the parts are by weight.

Example 1

One hundred parts of drained, dyed chrome-tanned calfskin suede leather are placed in a tanning drum, and 200 parts of water at 130° F. are added. The drum is revolved, and a mixture comprising 2.5 parts of sulfonated cod-oil, 2.0 parts of a 35% vinyl-acetate polymer dispersion and 8.0 parts of water is added through the gudgeon. Drumming is continued for 45 minutes. At the end of this time the leather is removed and horsed-up to drain. After draining, it is set-out, sammied, staked, dried, buffed and brushed. It shows much less tendency to crock, and is fuller and firmer, than similar leather not treated with the synthetic resin.

Example 2

Two parts of a 35% aqueous dispersion butyl methacrylate polymer are substituted for the vinyl-acetate polymer dispersion in Example 1. Results similar to those cited in Example 1 are obtained.

Example 3

Two parts of a 35% aqueous dispersion of chloro-2-butadiene-1,3, polymer are substituted for the vinyl-acetate polymer dispersion in Example 1. Results similar to those cited in Example 1 are obtained.

Example 4

Two parts of a 35% aqueous dispersion of methyl acrylate polymer are substituted for the vinyl-acetate polymer dispersion in Example 1. Results similar to those cited in Example 1 are obtained.

Example 5

One hundred parts of pearled chrome-tanned goatskin suede leather are placed in a tanning drum with 400 parts of water at 130° F. The drum is revolved for 2 hours, or until the leather is suitably wet-back. The leather is then rinsed and drained. Two hundred parts of water at 130° F. are added and the drum is revolved. A mixture comprising 5.0 parts of Pontamine Deep Blue B. H. Conc. (Color Index No. 401), 6.0 parts of a 35% aqueous dispersion of plasticized methyl methacrylate polymer and 16 parts of water at 130° F. is added through the gudgeon. After the drumming has been continued for 45 minutes, one part of 87% formic acid diluted with 8.0 parts of water is added through the gudgeon. After the leather has drummed for 15 minutes, it is drained and washed with running water at 130° F. for 10 minutes. Two hundred parts of water at 130° F.

are added to the drum. The drum is revolved and a mixture comprising 2.0 parts of sulfonated neat's-foot oil and 8.0 parts of water is added through the gudgeon. Drumming is continued for 45 minutes. At the end of this time the leather is removed and horsed-up to drain. After draining, it is set-out, dried, sammied, staked, dried, buffed and brushed. It shows much less tendency to crock, and is fuller and firmer, than similar leather not treated with the synthetic polymer.

*Example 6*

Six parts of a 35% aqueous dispersion of vinyl-acetate polymer are substituted for the plasticized methyl methacrylate polymer dispersion in Example 5. Results similar to those cited in Example 5 are obtained.

*Example 7*

Six parts of a 35% aqueous dispersion of butyl methacrylate polymer are substituted for the plasticized methyl methacrylate polymer in Example 5. Results similar to those cited in Example 5 are obtained.

*Example 8*

One hundred parts of pearled calfskin leather tanned by a process suitable for making white suede are placed in a tanning drum with 400 parts of water at 130° F. The drum is revolved for 2 hours, or until the leather is suitably wet-back. The leather is then rinsed and drained. The drum is revolved, and a mixture comprising 3.5 parts of finely divided titanium oxide pigment dispersed in 10 parts of water is added through the gudgeon. After drumming for 45 minutes, a mixture comprising 2.0 parts of sulfonated coconut oil, 8.0 parts of 35% butyl methacrylate polymer dispersion and 32.0 parts of water at 130° F. is added through the gudgeon. After drumming for 45 minutes, the leather is removed and horsed-up to drain. After draining, it is set-out, dried, sammied, staked, dried, buffed and brushed. It shows much less tendency to crock, and is fuller and firmer, than similar leather not treated with the synthetic polymer.

As indicated by the above examples, this invention may be carried out under conditions of time, temperature, type of equipment and ratio of bath volume to leather usually employed in the dyeing and fat liquoring of suede leather. These conditions are well known and long established in the industry, and anyone skilled in the art should have no difficulty in incorporating the invention within established tannery processes.

The amount of synthetic resin used will depend to a large degree on the peculiarities of the suede leather being treated. These peculiarities arise from such variables as type and age of the animals from which the skins are taken, geographical sources of the animals and modifications of the skins during the leather-making processes. Usually, from 2% to 10% of a 35% dispersion (based on the dry leather weight) will be sufficient.

Usually, suede leather is made from chrome-tanned sheepskin, chrome-tanned goatskin, chrome-tanned calfskin, or chrome-tanned cowhide split leather. Suede made from any of these leathers may be treated by this invention.

The synthetic resins may be applied from aqueous baths containing acid or direct dyes or mixtures of the two types. Dyes commonly used to color suede leather may be employed. Examples of suitable dyes are:

Pontamine Black E Double (Color Index No. 581)
Pontacyl Blue Black SX (Color Index No. 246)
Pontachrome Brown G (Color Index No. 238)
Pontacyl Green SN Extra (Color Index No. 737)
Du Pont Leather Yellow L Conc. (Color Index No. 10)
Du Pont Azo Yellow Conc. (Color Index No. 146)
Du Pont Leather Orange R Conc. (Color Index No. 234)
Du Pont Orange II Conc. (Color Index No. 151)
Du Pont Resorcin Brown 3R (Color Index No. 235)
Pontamine Brown CR (Color Index No. 601)
Pontacyl Fast Violet 10B (Color Index No. 696)
Pontacyl Fast Red AS Conc. (Color Index No. 176)
Pontamine Fast Red F Conc. (Color Index No. 419)
Pontamine Blue RW (Color Index No. 512)
Pontacyl Brilliant Blue E (Color Index No. 671)
Pontamine Deep Blue BH Conc. (Color Index No. 401)

The synthetic resins may also be applied from baths containing sulfonated oil fat liquors. Sulfonated animal, vegetable and mineral oils commonly used for fat liquoring suede leather may be employed. Examples are: sulfonated neat's-foot oil, sulfonated cod oil, sulfonated sperm oil, sulfonated castor oil, sulfonated coconut oil, sulfonated teaseed oil and sulfonated white mineral oil.

Among the preferred synthetic polymer dispersions are aqueous dispersions of polymerized vinyl-acetate prepared according to the copending application of Smith and Drummond, Serial No. 500,072, now U. S. Patent No. 2,413,197. These dispersions are characterized by their ability to form soft, continuous, thermoplastic films when dried on a glass plate. Aqueous dispersions of other synthetic polymers exhibiting this film-forming characteristic are also suitable. The examples above cite aqueous dispersions of butyl-methacrylate polymer, chloro-2-butadiene-1,3 polymer, methyl-acrylate polymer and plasticized methyl-methacrylate polymer. Dispersions of other synthetic polymers usable for our purpose are aqueous dispersions of: acrylonitrile polymer, vinyl chloride polymer, higher alkyl methacrylate polymers, and higher alkyl acrylate polymers and alkyd resins.

The aqueous dispersion may comprise a mixture of two or more of the above aqueous dispersions. For example, a mixture comprising 90 parts of a 35% dispersion of vinylacetate polymer and 10 parts of a 35% dispersion of chloro-2-butadiene-1,3 polymer is quite suitable. Another suitable mixture comprises 70 parts of a 35% butyl-methacrylate polymer dispersion and 30 parts of a 35% plasticized methyl-methacrylate polymer dispersion.

The aqueous dispersion may comprise an interpolymer of two or more of the above synthetic polymers. For example, an aqueous dispersion of an interpolymer comprising 70 parts of chloro-2-butadiene-1,3 and 30 parts of methylmethacrylate is suitable.

One of the principal objections to articles, such as shoes and handbags, fabricated from suede leather is the tendency for colored matter to crock or rub off. The leather industry has made numerous attempts to eliminate, or reduce, crocking. None of these attempts have come into widespread use, either because the desired result is not attained or because the properties of the leather are altered adversely.

This invention seeks to reduce the tendency of suede leather to crock. In the process of making suede leather, as now generally practiced, the dyed and fat liquored leather is buffed, that is brushed with an abrasive wheel. The action of the wheel is to cut and raise the leather fibers. In the process of buffing, some fine leather fibers are cut free of the body of the leather. Some of these fibers, "buffing dust," become embedded in the nap of the suede and are difficult to remove by brushing but cause crocking when the suede article is used. By this invention the individual leather fibers are surrounded by particles of the synthetic polymer. When the synthetic-polymer-treated leather is buffed the polymer causes the "buffing dust" to roll in to soft pellets by electrostatic attraction or actual adhesion. These soft pellets are easily removed by brushing and practically no buffing dust becomes embedded in the nap of the suede to cause crocking later.

This invention is in this respect distinctly different from the processes, such as disclosed in U. S. P. 2,294,069, in which the suede is sprayed or swabbed with a solution or emulsion of resins after buffing. Such surface treatment with resins simply cements the fine fibers embedded during buffing to the leather. It is disadvantageous in that its adds an additional step to the process of making the finished suede and also in that it tends to mat the fibers and may adversely affect the softness and depth of the nap.

According to our invention, the buffing dust is substantially eliminated together with the bulk of the synthetic polymer. The resulting nap is soft, velvet-like in feel and clean in the sense that it does not rub off. In addition, the leather itself has a desirable fullness and improved porosity due to the selective absorption of the polymer on the non-buffed side of the leather.

We claim as our invention:

1. A process for improving the qualities of suede leather which comprises subjecting suede leather to aqueous treatment in a bath comprising a sulfonated fat liquoring agent and further comprising an aqueous dispersion of a synthetic water insoluble polymer selected from the group consisting of vinyl acetate polymer, butylmethacrylate polymer and chloro-2-butadiene-1,3 polymer, the weight ratio of the said aqueous bath to the dry leather being greater than 1:1, and subsequently subjecting said leather to a finishing buffing operation.

2. A process for improving the qualitites of suede leather which comprises subjecting suede leather to aqueous treatment in a bath comprising a sulfonated fat liquoring agent and further comprising a 35% aqueous dispersion of a synthetic water insoluble polymer selected from the group consisting of vinyl acetate polymer, butylmethacrylate polymer and chloro-2-butadiene-1,3 polymer wherein said polymer is from 2 to 10% of the said 35% aqueous polymer dispersion, the weight ratio of the said aqueous bath to the dry leather being greater than 1:1, and subsequently subjecting the said leather to a finishing buffing operation.

3. A process for improving the qualities of suede leather which comprises subjecting suede leather to aqueous treatment in a bath comprising a sulfonated fat liquoring agent and a 35% aqueous dispersion of vinyl acetate polymer wherein the said vinyl acetate polymer is from 2 to 10% of the said 35% aqueous vinyl acetate dispersion, the weight ratio of the said aqueous bath to the dry leather being greater than 1:1, and subsequently subjecting the said leather to a finishing buffing operation.

4. A process for improving the qualities of suede leather which comprises subjecting suede leather to aqueous treatment in a bath comprising a sulfonated fat liquoring agent and a 35% aqueous dispersion of butylmethacrylate polymer wherein the said butylmethacrylate polymer is from 2 to 10% of the said 35% aqueous butylmethacrylate dispersion, the weight ratio of the said aqueous bath to the dry leather being greater than 1:1, and subsequently subjecting the said leather to a finishing buffing operation.

5. A process for improving the qualities of suede leather which comprises subjecting suede leather to aqueous treatment in a bath comprising a sulfonated fat liquoring agent and a 35% aqueous dispersion of chloro-2-butadiene polymer wherein the said chloro-2-butadiene polymer is from 2 to 10% of the said 35% aqueous chloro-2-butadiene dispersion, the weight ratio of the said aqueous bath to the dry leather being greater than 1:1, and subsequently subjecting the said leather to a finishing buffing operation.

DONALD TAYLOR KIRBY.
JOHN THOMAS CHAIN.

REFERENCES CITED

The following references are of record in the file of this patent:

UNITED STATES PATENTS

| Number | Name | Date |
|---|---|---|
| 2,036,000 | Sart | June 30, 1936 |
| 2,093,431 | Frolich | Sept. 21, 1937 |
| 2,118,308 | Jaeger | May 24, 1938 |
| 2,294,069 | Campbell | Aug. 25, 1942 |

FOREIGN PATENTS

| Number | Country | Date |
|---|---|---|
| 673,938 | Germany | Apr. 1, 1939 |